United States Patent
Smets et al.

(10) Patent No.: US 8,442,796 B2
(45) Date of Patent: May 14, 2013

(54) METHOD AND SYSTEM FOR SIMULATING A PROXIMITY-BASED TRANSACTION DEVICE

(75) Inventors: Patrik Smets, Nijlen (BE); Eddy Lodewijk Hortensia Van De Velde, Leuven (BE); Duncan Garrett, London (GB); David Anthony Roberts, Warrington (GB)

(73) Assignee: Mastercard International Incorporated, Purchase, NY (US)

( * ) Notice: Subject to any disclaimer, the term of this patent is extended or adjusted under 35 U.S.C. 154(b) by 353 days.

(21) Appl. No.: 12/668,179

(22) PCT Filed: Jul. 7, 2008

(86) PCT No.: PCT/US2008/069342
§ 371 (c)(1),
(2), (4) Date: Sep. 1, 2010

(87) PCT Pub. No.: WO2009/006635
PCT Pub. Date: Jan. 8, 2009

(65) Prior Publication Data
US 2010/0318315 A1    Dec. 16, 2010

Related U.S. Application Data

(60) Provisional application No. 60/948,087, filed on Jul. 5, 2007, provisional application No. 60/948,093, filed on Jul. 5, 2007, provisional application No. 60/955,708, filed on Aug. 14, 2007.

(51) Int. Cl.
*G06F 19/00* (2011.01)

(52) U.S. Cl.
USPC .......................................................... 702/122

(58) Field of Classification Search ................. 702/122, 702/182–185, 188
See application file for complete search history.

(56) References Cited

U.S. PATENT DOCUMENTS

| 4,053,844 | A | 10/1977 | Hamaoui |
| 5,016,212 | A | 5/1991 | Yamaguchi et al. |
| 6,253,163 | B1 | 6/2001 | Lapie |
| 6,536,673 | B1 | 3/2003 | Kawasaki et al. |
| 7,072,781 | B1 * | 7/2006 | Gershon et al. ................. 702/63 |
| 7,239,973 | B2 | 7/2007 | Schahl et al. |

(Continued)

OTHER PUBLICATIONS

U.S. Appl. No. 12/668,184, filed Apr. 17, 2012, Non-Final Office Action.

(Continued)

*Primary Examiner* — Edward Raymond
(74) *Attorney, Agent, or Firm* — Baker Botts LLP

(57) ABSTRACT

A system and method for testing and calibrating electronic contactless payment devices including reference payment cards and readers. The contactless payment devices transmit data by load modulating a subcarrier of an RF carrier signal. The system and method involve use of a common mode rejection (CMR) circuit to demodulate a received load-modulated data signal and to extract the data signal. The CMR circuit also generates a synchronous clock signal, a sample & hold signal and a sample & hold clock signal. Further, the input signal is feed to a zero-crossing detector and digital delay which in combination with an Analog-to-Digital Converter circuit is used to recreate the load (i.e. modulating) signal and to eliminate the large carrier portion of the selected input signal.

12 Claims, 20 Drawing Sheets

U.S. PATENT DOCUMENTS

| | | |
|---|---|---|
| 7,431,217 B2 | 10/2008 | Smets et al. |
| 7,765,080 B2 | 7/2010 | Ludwig et al. |
| 7,775,445 B2 | 8/2010 | Smets et al. |
| 2003/0179028 A1 | 9/2003 | Kizer et al. |
| 2004/0008010 A1 | 1/2004 | Ebrahim et al. |
| 2004/0008018 A1 | 1/2004 | Miller et al. |
| 2004/0099737 A1 | 5/2004 | Saeki |
| 2005/0185460 A1 | 8/2005 | Roesner et al. |
| 2005/0280742 A1 | 12/2005 | Jaffe |
| 2006/0022044 A1 | 2/2006 | Smets et al. |
| 2006/0022045 A1 | 2/2006 | Smets et al. |
| 2006/0027655 A1 | 2/2006 | Smets et al. |
| 2006/0276989 A1 | 12/2006 | Ludwig et al. |
| 2008/0165951 A1 | 7/2008 | Somers et al. |
| 2008/0191031 A1 | 8/2008 | Smets et al. |
| 2009/0303885 A1 | 12/2009 | Longo |
| 2010/0318315 A1 | 12/2010 | Smets et al. |
| 2011/0042465 A1 | 2/2011 | Smets et al. |

OTHER PUBLICATIONS

International Search Report for PCT/US08/069337, dated Oct. 3, 2008.
International Search Report for PCT/US08/069342, Sep. 19, 2008.
U.S. Appl. No. 12/668,184, filed Nov. 15, 2012, Final Office Action
U.S. Appl. No. 12/668,184, Sep. 17, 2012, Response to Non-Final Office Action.

* cited by examiner

Common parameters

Power Supply: 13,56 MHz, inductive coupling
Field strength: 1,5.. 7,5 A/m

Type A:

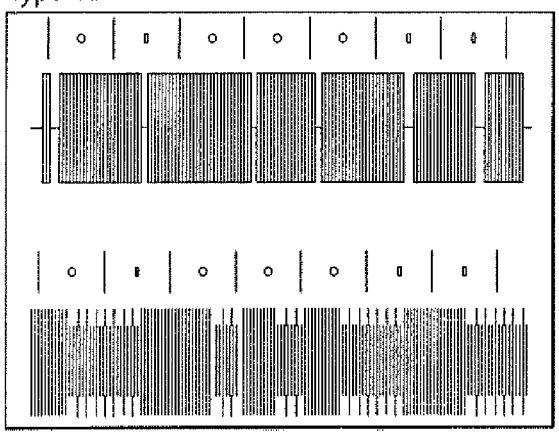

Downlink:
ASK 100%, modified Miller Code, 106 kBit/s
Uplink:
Load modulation with 847 kHz Subcarrier ASK-modulated, Manchester Code, 106 kBit/s
Anticollision:
Binary search tree Type B:

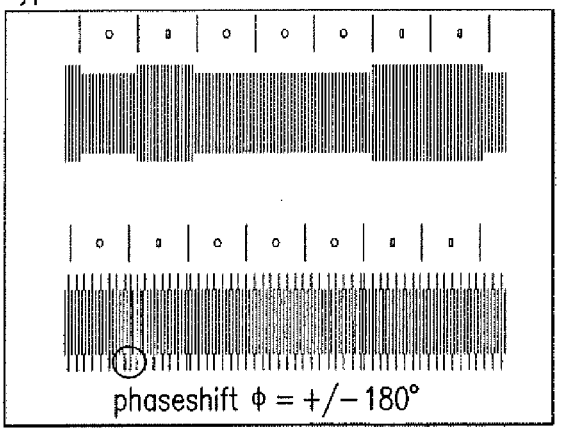

phaseshift ϕ = +/−180°

Downlink:
ASK 10%, NRZ Code, 106 kBit/s
Uplink:
Load modulation with 847 kHz Sub carrier BPSK (bi-phase shift keying) modulated, NRZ Code, 106 kBit/s
Anticollision:
Slotted Aloha

FIG. 2

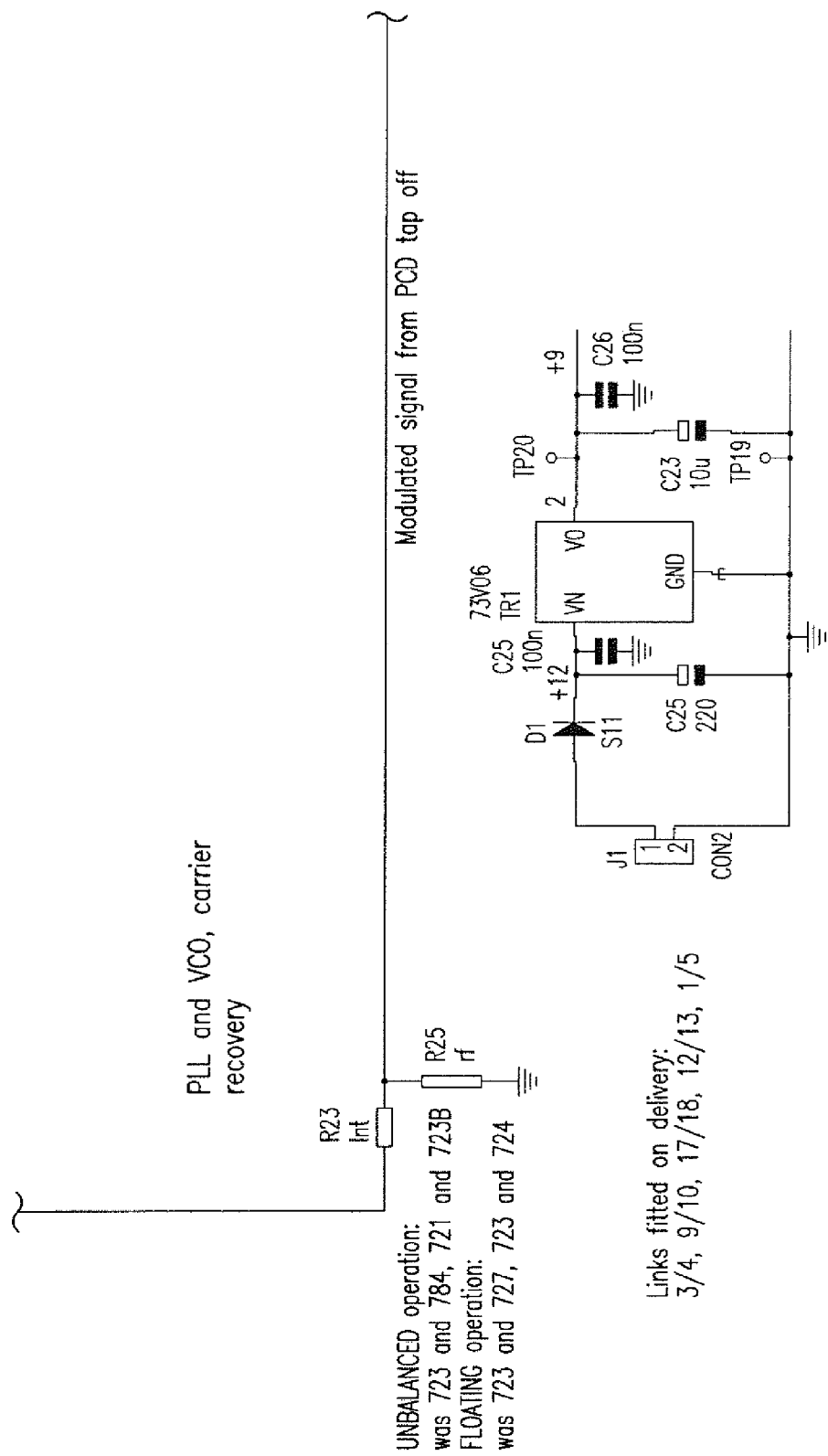

DL1/DL2 delay setting process

METHOD AND SYSTEM FOR SIMULATING A PROXIMITY-BASED TRANSACTION DEVICE

CROSS-REFERENCE TO RELATED APPLICATIONS

This application is a 35 U.S.C. 371 National Phase of International Application PCT/US08/069342, filed Jul. 7, 2008, published Jan. 8, 2009, which claims the benefit of United States provisional patent applications No. 60/948,087 filed on Jul. 5, 2007, 60/948,093 filed on Jul. 5, 2007, and 60/955,708 filed on Aug. 14, 2007. All of the aforementioned patent applications are hereby incorporated by reference herein in their entireties.

BACKGROUND OF THE INVENTION

Radio Frequency Identification (RFID) tags are small integrated circuits (ICs) connected to an antenna, which can respond to an interrogating RF signal with simple identifying information, or with more complex signals depending on the size of the IC. This technology does not require contact or line of sight for communication. Radio Frequency Identification (RFID) technology is now economically viable and is deployed in more and more commercial and industrial applications. For example, RFID technology is now widely used for tags on items in warehouses, shops, ID or access cards, etc. In addition, a type of RFID technology has been introduced in the payment card industry (e.g., by MasterCard, American Express and Visa) in the form of "contactless" payment or credit cards embedded with RFID tags. These contactless payment cards can be used to make electronic payment transactions via radio communication with an RF-enabled payment terminal. The contactless payment cards can provide consumers with simple, fast and convenient ways to pay for goods and services, for example, in retail establishments, stores or supermarkets.

Several RF technologies are available for use in contactless payment cards and card readers/terminals. The basic components of a contactless system are the contactless reader (or Proximity Coupling Device (PCD)) and a transponder (or Proximity Integrated Circuit Card (PICC)). The contactless reader is an antenna connected to an electronic circuit. A transponder consists of an inductive antenna and an integrated circuit connected to the ends of this antenna. The combination reader-transponder behaves as a transformer. An alternating current passes through a primary coil (reader antenna) that creates an electromagnetic field, which induces a current in the secondary coil (transponder antenna). The transponder converts the electromagnetic field (or RF field) transmitted by the contactless reader (PCD) into a DC voltage by means of a diode rectifier. This DC voltage powers up the transponder's internal circuits. The configuration and tuning of both antennas determines the coupling efficiency from one device to the other. The transponders can be the contactless payment cards (or payment devices, when not in card form).

For contactless payment card systems to be economically viable and to gain commercial acceptance, the contactless payment cards must be interoperable at all or most RF-enabled payment terminals, even when the cards and terminals have technological features that are proprietary to specific card providers/issuers, vendors or terminal manufacturers. Industry-wide interoperability is desirable. Towards this end, industry standards organizations and groups (e.g., International Organization for Standards (ISO) and International Electro Technical Committee (IEC)) have formulated voluntary industry standards for implementation of contactless payment technologies. Three such exemplary standards which have been defined by ISO/IEC are the ISO/IEC 10536, ISO/IEC 14443, and ISO/IEC 15693 standards applicable to Close Coupling, Proximity and Vicinity cards, respectively.

The ISO/IEC 14443 proximity card standards (ISO 14443) have been used for several contactless card deployments worldwide. The targeted range of operations for ISO 14443 proximity cards is up to 10 cms, although this range varies depending on power requirements, antenna geometries, memory size, CPU, and co-processor.

The ISO 14443 standards document has four distinct parts:

Part 1: Physical Characteristics, defines the physical dimensions for a Proximity Integrated Circuit Card (PICC). The card is the ID-1 size (85.6 mm×54.0 mm×0.76 mm). This is the same size as traditional payment card.

Part 2: Radio Frequency Power and Signal Interface, defines key technical characteristics of the contactless IC chips, including items such as frequency, data rate, modulation, and bit coding procedures. Two variations are detailed in Part 2, the Type A interface and the Type B interface. Both operate at the same frequency and use the same data rate, but they differ from one another in the areas of modulation and bit coding.

Part 3: Initialization and Anticollision. Initialization describes the requirements for proximity coupling device (PCD) (i.e., the reader) and the card to establish communication when the card is brought into the reader's radio frequency (RF) field. Anticollision defines what happens when multiple cards enter the magnetic field at the same time, identifying how the system determines which card to use in the transaction and ensuring that all cards presented are inventoried and processed.

Part 4: Transmission Protocols, defines the data format and data elements that enable communication during a transaction.

For a system of contactless payment cards and card readers to be compliant with ISO 14443, they must meet the requirements of at least some of parts of the voluntary standard. In addition to contactless technologies that are standardized under ISO 14443, a number of proprietary contactless interfaces are also used in the industry (e.g., Cubic's GO-Card and Sony's FeliCa card). With existing card technology deployments, interoperability can be an issue. Card readers deployed by vendors in the marketplace should preferably accommodate several different card types. For example, a desirable card reader would support ISO 14443 Type A and Type B cards, ISO 15693 cards and any additional proprietary card types.

Interoperability issues can arise even with card deployments that are presumably compliant with a single ISO standard (e.g., ISO 14443). In the ISO 14443 standard, all requirements or specifications related to RF Power and signal interfaces in the contactless card and reader system (i.e., the physical layer in an Open System Interconnection (OSI) model view of the system) are defined using separate standardized tests for cards and for readers. The ISO/IEC 10373 Standard Part 6 (ISO 10373-6) deals with test methods, which are specific to contactless integrated circuit card technology (proximity card). Compliance of contactless cards and readers to ISO 14443 is verified using reference devices. According to ISO 10373-6, a set of "reference" cards (i.e., Reference PICC), which represent the characteristics of contactless cards, is used for measuring specification compliance of a contactless reader. (See, e.g., FIG. 1a). For example, the Reference PICC is used to test the magnetic field produced or transmitted by a PCD, and to test the ability of the PCD to power a PICC. Similarly, a "reference" reader (i.e., a Test or Reference PCD), which can represent the characteristics of a typical contactless reader, is used for measuring specification compliance of contactless cards. For example, the Reference PCD in conjunction with a pair of external sense coils is used to test the load modulation that is generated by cards during testing.

While the separate card and reader compliance test procedures under ISO 10373-6 can ensure that deployed product devices individually have characteristics that fall in either the designated specification ranges for cards or readers, the procedures do not ensure interoperability in the field. Cards and/or readers verified as compliant can be only marginally so (e.g., by having a characteristic value at the end or edge of a designated specification range). This manner of standards compliance can lead to operational failure in the field. For example, a marginally compliant card can be unreadable or difficult to read using a card reader that is also only marginally compliant.

Further, with respect to verifying important data transmission and reception of functions of contactless devices, ISO 10373-6 makes provisions for only indirect measurements of the load modulated data signals generated by cards. A PCD Test Assembly prescribed by ISO 10373-6 for testing product cards has a pair of sense coils that are external to the reference PCD reader. These external sense coils are utilized to measure the load modulated data signal generated and transmitted by card under test. (See e.g., FIG. 1). However, there is no direct or obvious relation between the load modulated signal measured by the sense coils and the signal that is physically received by the reference PCD antenna. Therefore, testing of data transmission functions of a product card using the external sense coils does not provide direct assurance that a putatively ISO compliant product card's modulation of data signals is sufficient or compatible with a product reader's ability to receive or process the modulated data signals properly.

Consideration is now being given to ways of enhancing interoperability of electronic payment devices that are used in contactless electronic payment systems. Attention is directed to reducing variations in card and reader properties consistent with commonly accepted standards. In particular, attention is directed to improving specification compliance procedures and test equipment to enhance interoperability of payment devices.

SUMMARY OF THE INVENTION

The present invention provides signal characterization methods for testing the data transmission and reception functions of interacting payment cards and readers used in electronic payment systems. The signal characterization methods utilize a CMR circuit to demodulate carrier signals that are received by a reader antenna, and to thereby accurately recover small amplitude data signals transmitted by the cards. Analysis of the card data signals received at the reader antenna will provide a more accurate characterization of card data transmission functions than prior art methods, which use external sense coils as a proxy for the reader antenna.

In exemplary contactless payment card technology implementations such as PayPass, the CMR circuit is provided in the Reference PCD reader device designated for testing product payment card functions. The CMR circuit and the Reference PCD reader antenna both can be fabricated on a common circuit board or as alternative, the CMR circuit and the Reference PCD reader can be manufactured as separate units.

An exemplary CMR circuit provides a means for removing the carrier component from an input signal, leaving intact and unchanged the modulation portion. Such process is described in ISO 10373-6. However, his method does not provide a good test for interoperability. Therefore, a means to remove the carrier from the input signal, as observed at the PCD, is desirable. FIG. 4 and FIG. 5 show an exemplary CMR where a clock signal is regenerated from the carrier by means of a Phase Locked Loop which is then subtracted from the signal to reduce its amplitude. FIGS. 6, 7, 8, 10A, 10B, 11, 12, 13 and 14 show another design. Although, the Phase Locked Loop CMR works well, an implementation requires careful manual adjustment in use. The second exemplary design recovers the clock by detecting its zero crossing edges, and it is eliminated by sampling the signal using this recovered clock. However, for this system to work efficiently, the phase of the clock should be programmatically adjustable, and this is achieved by use of digital delay lines.

When this circuitry is connected to a computer, the computer can cause the delay lines to be automatically adjusted to eliminate the carrier and recover the modulation (synchronous demodulation). In addition, by careful use of a multiplexer for selecting delay line tap points and use of signal inversion, it is possible to generate two clocks with a defined phase difference of 90 degrees and synchronize the sampling of the signal to any point in the 360 degrees of the received carrier.

An exemplary CMR circuit includes a zero-crossing detector (ZCD) and a series of delay lines. The CMR circuit is used to demodulate the received load-modulated data signal, to extract the load modulated subcarrier data signal, to generate a synchronous clock signal, to generate a sample & hold signal and to generate a sample & hold clock signal. The ZCD is used to detect when the input signal goes from positive to negative or from negative to positive level and to produce a Positive Emitter Coupled Logic (PECL) output clock signal corresponding to the points when the selected input signal crosses 0V. Someone skilled in design will appreciate that other logic families such as ECL could equally be used. The delay lines used to delay the output of the ZCD until the output clock signal transitions exactly at the peak of the selected input signal. The resulting output signals are fed to an Analog-to-Digital Controller (ADC) circuit used to take the signals and the synchronous clock from the CMR. The ADC circuit samples the signals from the reference contactless card/reader synchronously, at positive or negative peak points on the input waveforms, to recreate the load (i.e. modulating) signal and to eliminate the large carrier portion of the selected input signal. It is also possible to extract a second clock from another tap point in the delay line and with careful design arrange for it to be possible to generate two clock outputs that differ in a fixed and arbitrary phase relationship. This is useful, for example, for synchronous quadrature sampling using clocks that are 90 degrees out of phase.

Further features of the invention, its nature and various advantages will be more apparent from the accompanying drawings and the following detailed description.

DETAILED DESCRIPTION OF THE INVENTION

Figure 1:
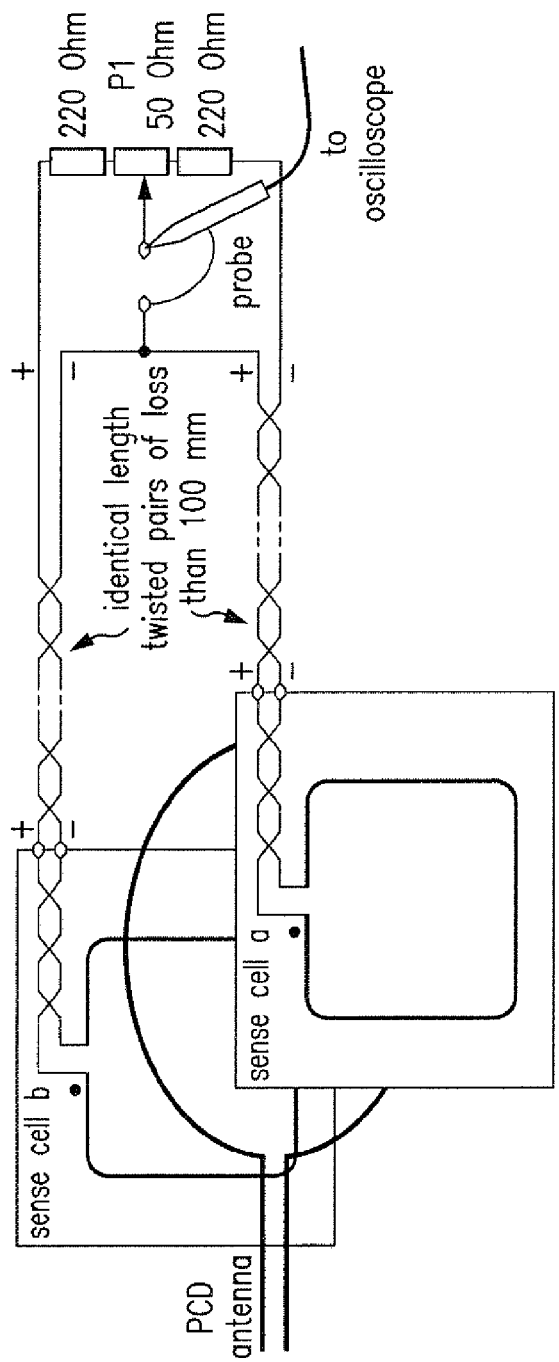
FIG. 1 is an illustration of a reference reader test assembly, which includes a pair of external sense coils for measuring small amplitude data signals generated by a payment card, in accordance with ISO 10373-6.

Signal characterization methods for testing data transmission and reception functions of interacting payment cards and readers that are used in contactless electronic payment systems are provided. The signal characterization methods utilize a CMR circuit to demodulate carrier signals that are received by a reader antenna and to recover the load modulated data signals transmitted by the cards. The load modulated data signals may have substantially small amplitudes compared to the carrier signal amplitudes. Analysis and measurements of the load modulated data signals received at the reader antenna will provide a more accurate characterization of card data transmission functions than prior art methods, which use external sense coils as a proxy for the reader antenna.

The inventive signal characterization methods and circuits are described herein in the context of implementations of electronic payment systems in which the contactless payment device specifications are intended to conform to a common industry standard such as the ISO 14443 Standard, which further specifies standardized test methods (i.e., ISO 10373-6 Test Methods, Proximity Cards) for verification of the specification of individual contactless payment devices. Recently, assignee MasterCard International Incorporated ("MasterCard") has developed proprietary specifications MasterCard PayPass™ ISO/IEC 14443 Implementation Specification ("PayPass") for implementation of proximity payment card technologies (e.g., by issuers, vendors or manufacturers of cards and card readers). The PayPass implementation is consistent with the ISO 14443 Standard and provides a convenient example illustrating the principles of the present invention. It will be understood that the selection of the PayPass implementation for purposes of illustration herein is only exemplary, and that the principles of the present invention can be more generally applied to electronic payment devices and systems that operate under other common industry or proprietary standards.

In common industry electronic payment systems, which conform to specifications such as the ISO 14443 Standard, power and data between a contactless card reader and a payment card are transmitted via a 13.56 MHz carrier signal. The ISO 14443 Standard calls for payment cards to transmit bit-encoded data at 106 Kbps on an 847.5 kHz square wave sub-carrier. (See FIG. 2). The payment cards superimpose a weak amplitude (or low modulation index) data signal on the reader-generated carrier signal by switching an inductive, capacitive or resistive load in and out of circuit i.e., by load modulation. In most instances of card operation, the modulation amplitude is the range of about a couple of mV up to about 100 mV, which is superimposed on a reader-generated carrier signal that can have amplitudes in the range of about a few volts. The low modulation index, which is typically <1/100 for the load-modulated carrier signal, makes it difficult to extract the card data signal for accurate characterization or measurements. Such accurate characterization or measurements can be necessary for reliably ensuring specification compliance of the data transmitter and for ensuring that the payment devices are interoperable. ISO 10373-6 recommends a technique called Common Mode Rejection (CMR) for extracting the small value load modulation signal from the carrier signal for PICC load modulation testing.

The inventive signal characterization methods for testing the data transmission and reception functions of interacting payment cards and readers are also are based on the CMR technique. A CMR circuit is provided in the reference reader (e.g., the PayPass-Reference Reader), which is used for testing card functionality. The reader antenna is connected to an input of the CMR circuit. The CMR circuit processes the modulated carrier signal received at the Reference PCD itself and extracts the small amplitude load modulated data signal from the large amplitude carrier signal.

Figure 4:
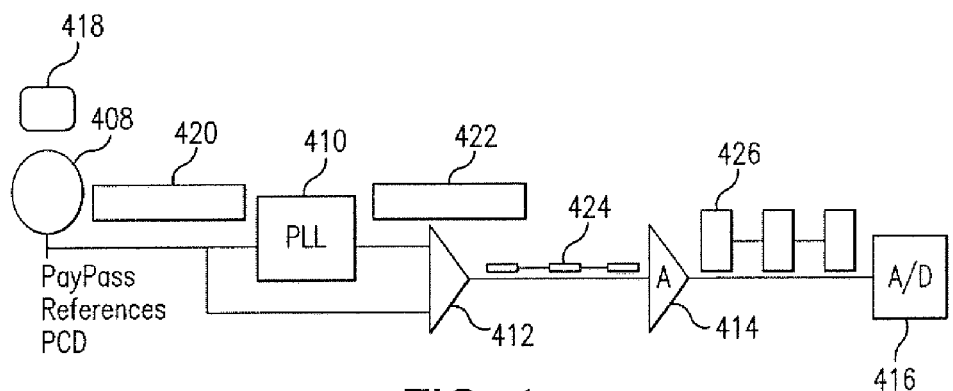
FIG. 4 is block diagram of a Phase Locked Loop (PLL) based common mode rejection (CMR) circuit coupled to a reference reader antenna, in accordance with the principles of the present invention.

FIG. 4 shows a block diagram of an exemplary CMR circuit 400 described in further details in allowed, related U.S. patent application Ser. No. 11/182,358. CMR circuit 400 includes a phase locked loop (PLL) circuit 410, a differentiator 412, an amplifier 414, and an optional A/D converter 416. An input end of CMR circuit 400 is connected to an output lead of reader antenna 408. PLL circuit 410 is designed to average out small variations in the input signal to produce an output signal, which has stable frequency, phase and amplitude. PLL circuit 410, which includes known elements such as a phase detector and oscillator, can be conveniently designed using known electronics circuit design principles. (See e.g., http://en.wikipedia.org/wiki/Phase-locked_loop).

In operation, a PICC 418 under test is placed on the landing plane of the PayPass-Reference PCD. PICC 418 under test conditions generates load-modulated data signals superimposed on the 13.56 MHz carrier signal, which is received by antenna 408. PLL 410 processes the received carrier signal 420 to average out the small amplitude small variations in the received signal 420 to generate a "carrier-replica" signal 422 which is an accurate replica of the unmodulated 13.56 MHz carrier signal (i.e. without the load modulation by the card).

The carrier-replica signal 422 and the received signal 420 are fed into a differentiator 412, which subtracts the former signal from the latter signal to accurately reproduce the small amplitude data signal 424 generated by the PICC 418 under test conditions. Data signal 424 can then be further amplified by amplifier 414, and displayed directly on an oscilloscope for graphical measurements or processed through an optional analog-to-digital converter 416 prior to measurement or analysis.

The inventive signal detection methods and circuits can be used in conjunction with the systems and methods disclosed in allowed, related U.S. patent application Ser. No. 11/182,357 for enhancing the interoperability of contactless payment devices (i.e., product cards issued to consumers and product readers deployed by merchants). The disclosed systems and methods ensure that individual product cards and readers operate or function in tighter specification ranges than they are permitted to operate in under the ISO 14443 standard. The systems and methods involve cross-calibrating the reference devices (e.g., PayPass-Reference PICC and PayPass-Reference PCD devices disclosed in allowed, related U.S. patent application Ser. No. 11/182,357), which are used to test specification compliance of individual product readers and cards under the ISO 14443 and ISO 10373-6 standards. The Reference PCD is used to establish a range of observed functional behaviors or parameters ("nominal card range") of the Reference PICC. Product card readers are required to have functional behaviors or parameters that are within this nominal card range as measured by the Reference PCD. Conversely, a Reference PICC is used to establish a range of observed functional behaviors or parameters ("nominal reader range") of Reference PCDs. Product readers are required to have functional behaviors or parameters that are within the nominal reader range when reading the reference card.

Exemplary procedures for ensuring data transfer interoperability of product contactless payment devices, can involve the following steps:
  (a) testing data reception (e.g., load modulation sensitivity) by a PCD by generating different signals through the Reference PICC. The PayPass-Reference PICC is first calibrated with respect to the Reference PCD to determine the levels and characteristics of the different signals generated by the Reference PICC, and
  (b) measuring the data transmission by a PICC on the Reference PCD, with the Reference PCD sending "average" value commands to the PICC and with the Reference PCD providing an "average" power level. Both the power level and the command characteristics produced by the Reference PCD are calibrated with respect to the Reference PICC.

Provision of a CMR circuit connected to the reader antenna in the Reference PCD provides direct access to the PICC data signals as received by readers, and hence leads to more accurate measurements of the data transmission functions of PICC devices. The CMR circuit can be provided along with other electronic circuits in the PayPass-Reference PCD device, which is designed for testing a payment card that can be used with any of several card readers deployed in an electronic payment system. The PayPass-Reference PCD electronic circuits are configured to exhibit external behavior, which is representative of the behaviors of the several readers and interacting cards deployed in an electronic payment system. The electronic circuits include a printed circuit board antenna of about 7 cm diameter, which is resonant at 13.56 MHz.

Figures 1, 5:
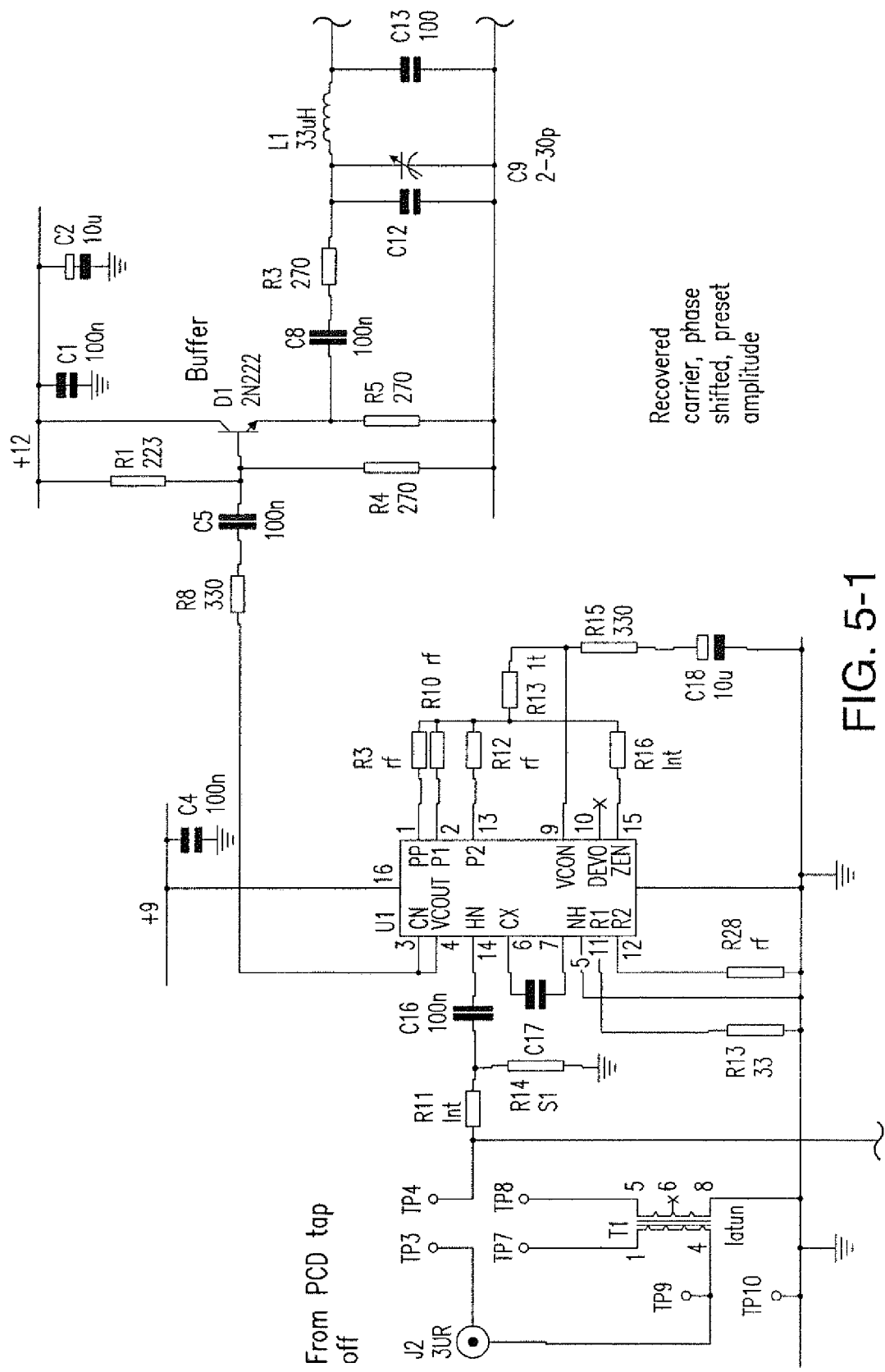
FIG. 5 is a circuit diagram of an exemplary CMR circuit coupled to a reference reader antenna, in accordance with the principles of the present invention.
Figures 2, 5:
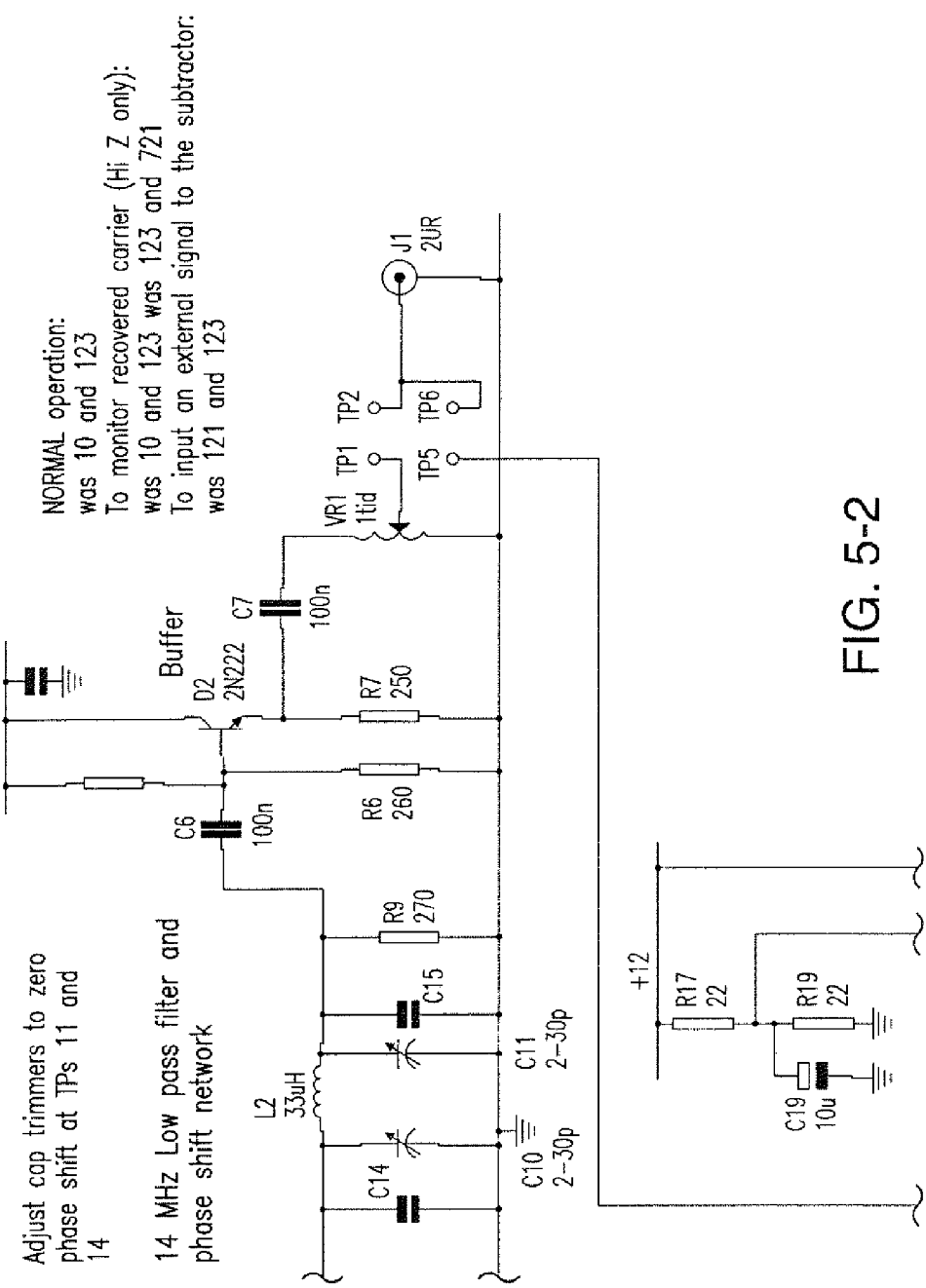
FIG. 2 is a schematic illustration of carrier signal modulation schemes for data transmission between contactless payment cards and readers, which are prescribed by the ISO 14443 Standard.
Figures 4, 5:
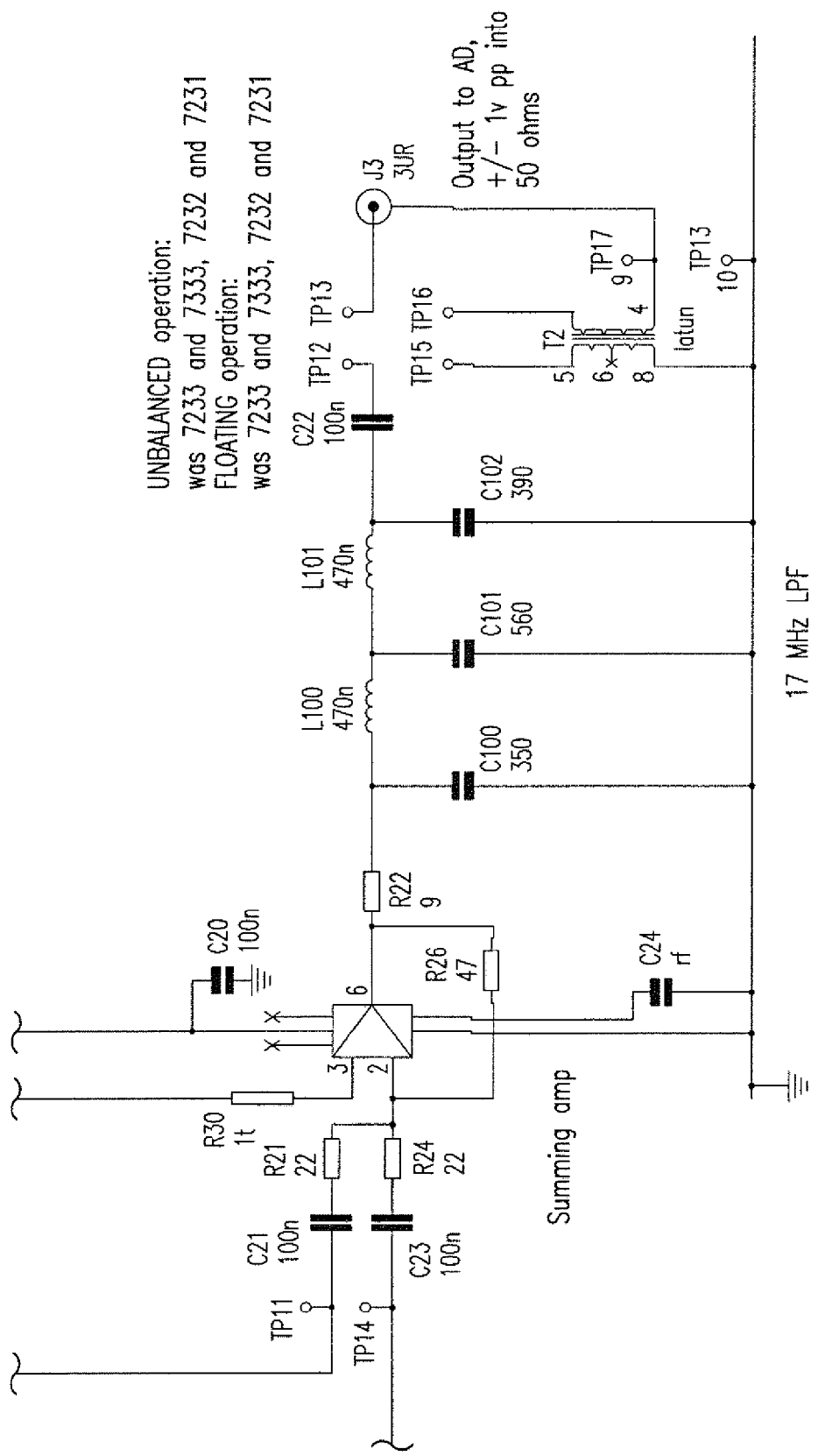

FIG. 5 shows a circuit diagram of an exemplary CMR circuit 500 which can be used with the PayPass-Reference PCD antenna to isolate the relatively weak signal created by PICC modulation. In operation, the signal from the PCD antenna input to CMR circuit 500 might be an approximately 1 $V_{PP}$ 13.56 MHz carrier wave, which is amplitude modulated. The modulating card data signal is an 847.5 KHz square wave subcarrier. As the modulation index is very low, CMR circuit 500 reduces the residual carrier amplitude significantly (e.g. by approximately 40 dB), which effectively increases the modulation index of the received signal by the same amount, so that the 847.5 KHz data signal can be sampled in a practical and useful manner. The sampling and measurements can be effectively performed by an analog-to-digital converter, which can be a standalone unit or built into an oscilloscope as desired.

Figure 6:
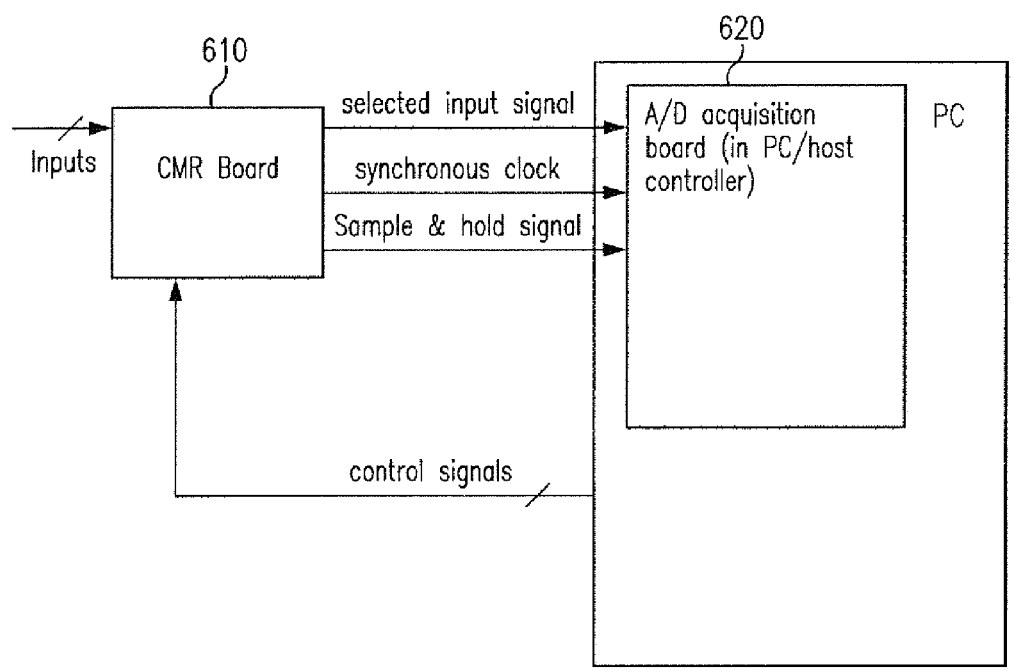
FIG. 6 is block diagram of an alternative exemplary CMR circuit coupled to an A/D acquisition board based on zero crossing detectors and delay lines, in accordance with the principles of the present invention.

FIG. 6 shows an alternative exemplary way of connecting CMR circuit 610 to an A/D acquisition board 620. CMR circuit 610 can accept input from the PICC, PCD, or a waveform generator, and can generate synchronous clock output signal to enable the A/D acquisition card to sample the input signal at a particular point on the input waveform (typically at the positive or negative peaks of the input waveform). CMR circuit 610 can include a zero crossing detector (ZCD)

Figure 7:
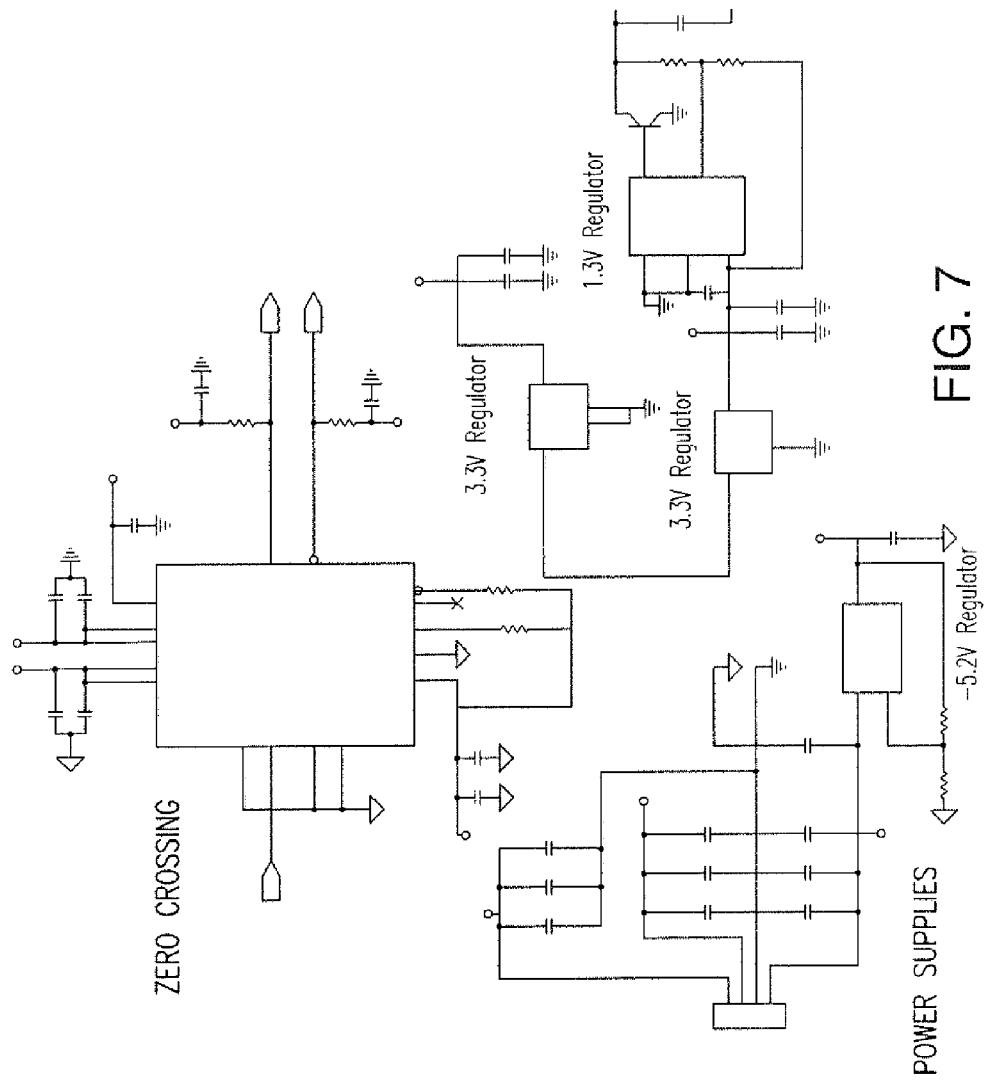
FIG. 7 is a circuit diagram of a zero crossing detector, in accordance with the principles of the present invention.

FIG. 7 shows an exemplary circuit diagram of a zero crossing detector (ZCD) which can be used as an integral part of an exemplary CMR circuit 610 (See FIG. 6). The ZCD can be used to detect when the input signal crosses zero in either direction. The typical ZCD is an ultrafast voltage comparator which compares the selected input signal (from the Reference PCD, Reference PICC pickup coil, or signal generator) against 0V and, in one embodiment by means of PECL (Positive Emitter Coupled Logic), produces output clock and inverted clock signals. A small DC offset exists but has no material effect on performance in this application.

Figure 8:
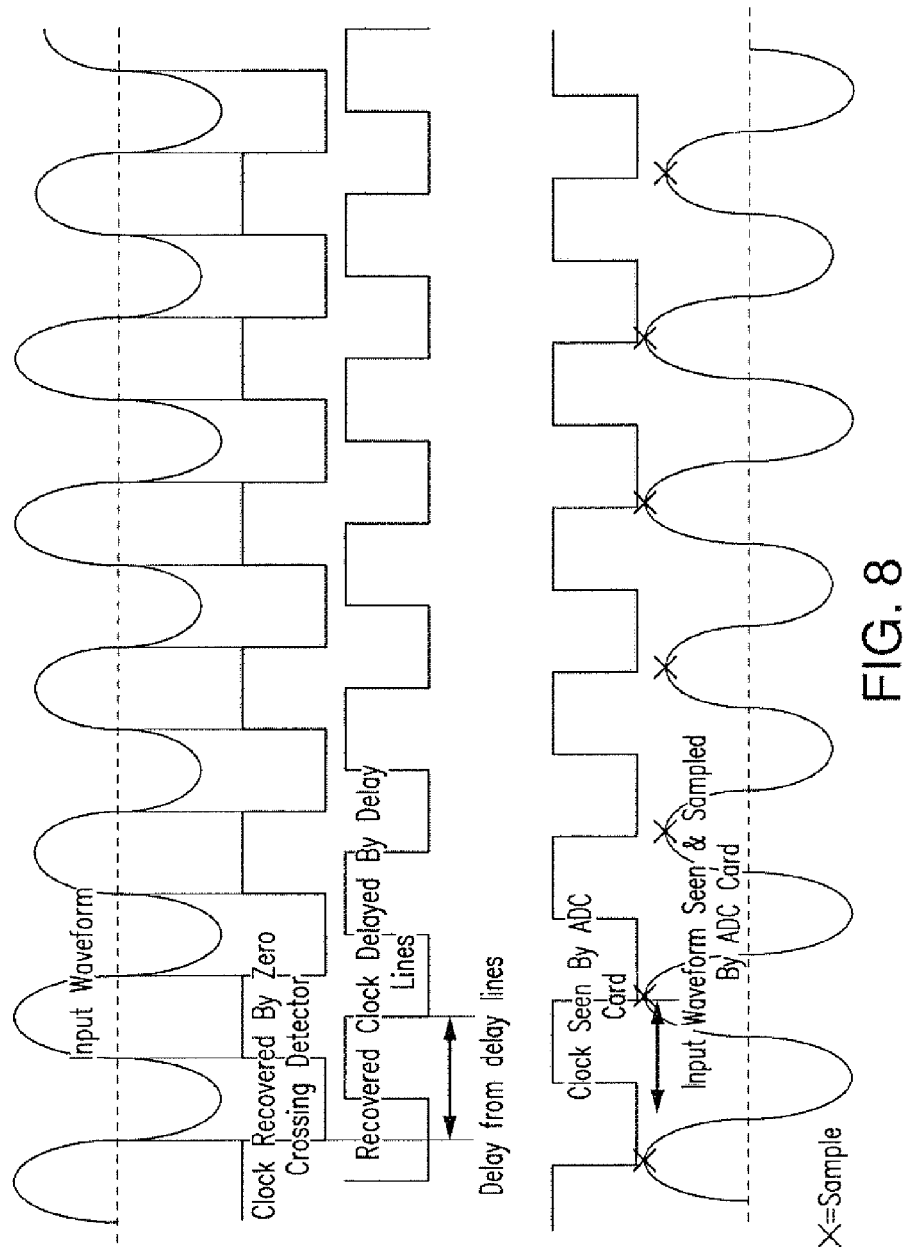
FIG. 8 is an illustration of waveforms representing an input signal, and various clock and sampling signals in accordance with one embodiment of the present invention.

FIG. 8 illustrates how the exemplary CMR that employs a zero-crossing detector can acquire the input signal, detect when the input voltage goes from positive to negative or from negative to positive, and produce a ECL output clock. Then, CMR can, by using a series of delay lines (See FIG. 10A and FIG. 10B), produce the output clock signal. The output of the ZCD is delayed until the output clock signal transitions exactly at the peak of the selected input signal.

Figure 3:
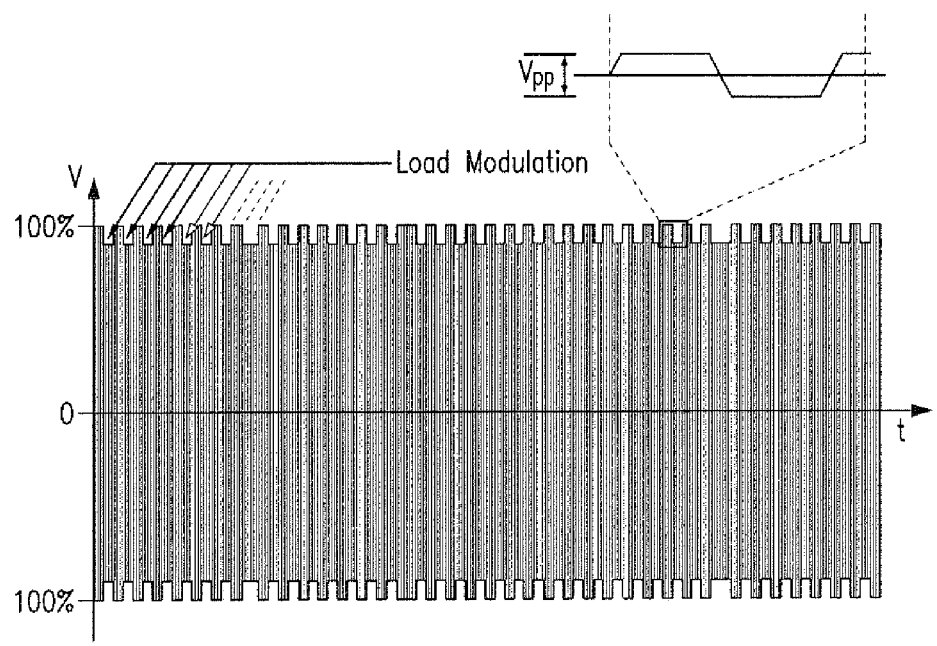
FIG. 3 is schematic illustration of a low modulation index load modulation data signal generated by a payment card.
Figure 9:
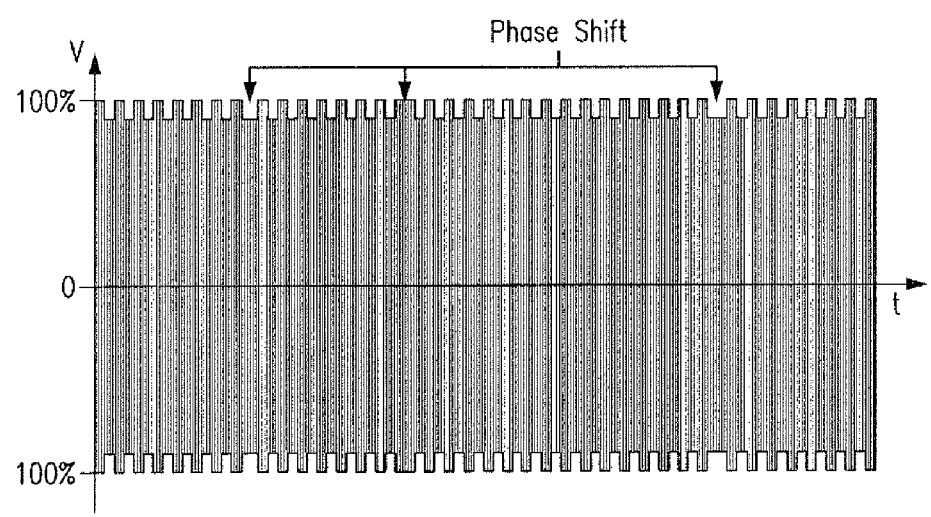
FIG. 9 is schematic illustration of a BPSK modulation of carrier RF signal modulated by payment card (PICC).

FIGS. 3 and 9 illustrate how by using the selected input signal (such as the signal from the PCD antenna), and the synchronous clock, the exemplary acquisition board can sample only positive (or negative) peaks from the input signal, thereby recreating the envelope of the modulation signal without being obscured by the large carrier signal. This is particularly useful when the modulation signal produced by the card is under investigation, as the card communicates with the PCD reader by load modulation using on-off keying (See e.g. FIG. 3) or binary phase shift keying BPSK modulation (See e.g. FIG. 9), resulting in a very small voltage drop being applied to the carrier signal generated by the PCD reader.

Figure 10A:
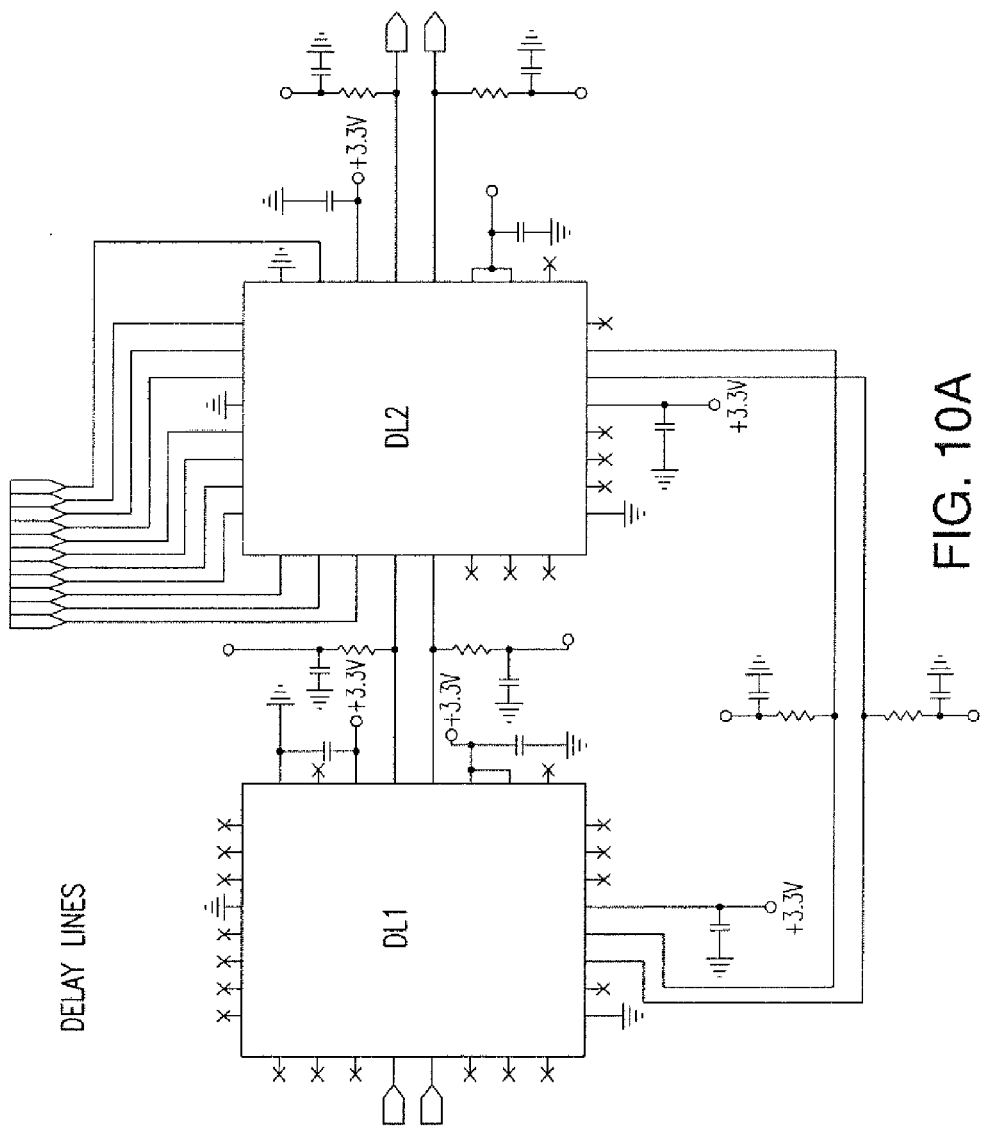
FIG. 10A is a circuit diagram of delay lines DL1 & DL2, in accordance with the principles of the present invention.
Figure 10B:
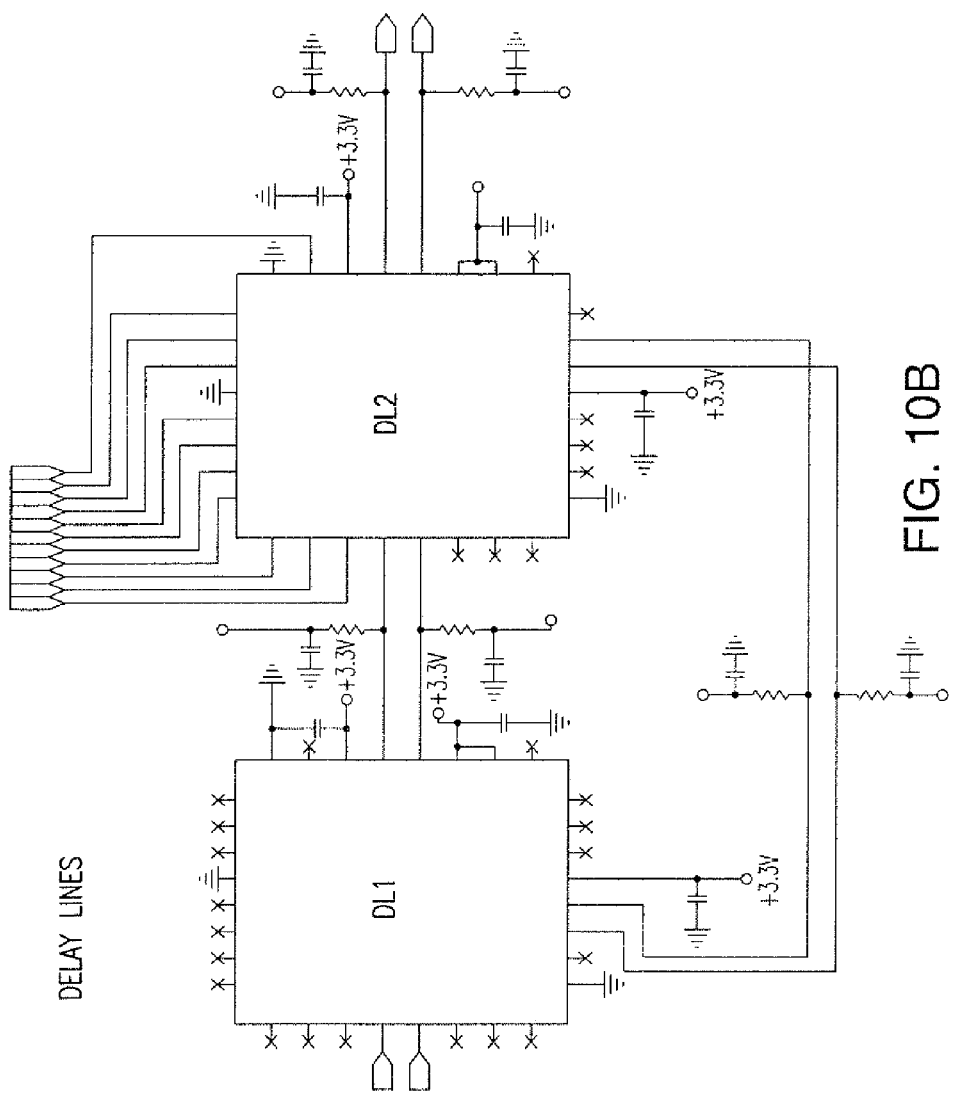
FIG. 10B is a circuit diagram of delay lines DL3 & DL4, in accordance with the principles of the present invention.

FIG. 10A and FIG. 10B show the exemplary delay lines circuitry which can be used as an integral part of an exemplary CMR circuit 610 (See FIG. 6). The delay lines consist of four programmable delay chips in series. Each chip can be programmed to delay the PECL clock and inverted clock signals by between 2.2 ns and 12.2 ns in 10 ps increments. The four delay line chips are organized in two pairs of two chips referred to as DL1+DL2 and DL3+DL4. (See FIG. 10A and FIG. 10B). Note that the output from DL3+DL4 includes any delay introduced by DL1+DL2. The required delay is programmed via two 16 bit I2C General Purpose Input/Output (GPIO) control chips (See FIG. 14) described below. Each pair of delay lines gives a programmable delay of between 4.4 ns and 24.4 ns. At 13.56 MHz a complete cycle takes 73.75 ns. It can therefore be seen that the combination of two pairs of delay lines with each pair producing a clock and an inverted clock signal, permits a clock to be produced at any required phase relative to the input signal, so as great as 360° of programmable delay is provided. As the output clock and inverted clock signals are available after each pair of delay lines it can also be seen that it is possible to derive a second clock signal that is 90° out of phase with the first. Note that the absolute delays given by the delay lines are temperature sensitive, however absolute delays are not required in practical use. The Reference CMR circuit reaches operating temperature quickly and is stable after a few minutes. In practice this means that the Reference CMR circuit should be switched on 5 minutes before any use is made of it and it should be left powered up during a test session.

Figure 11:
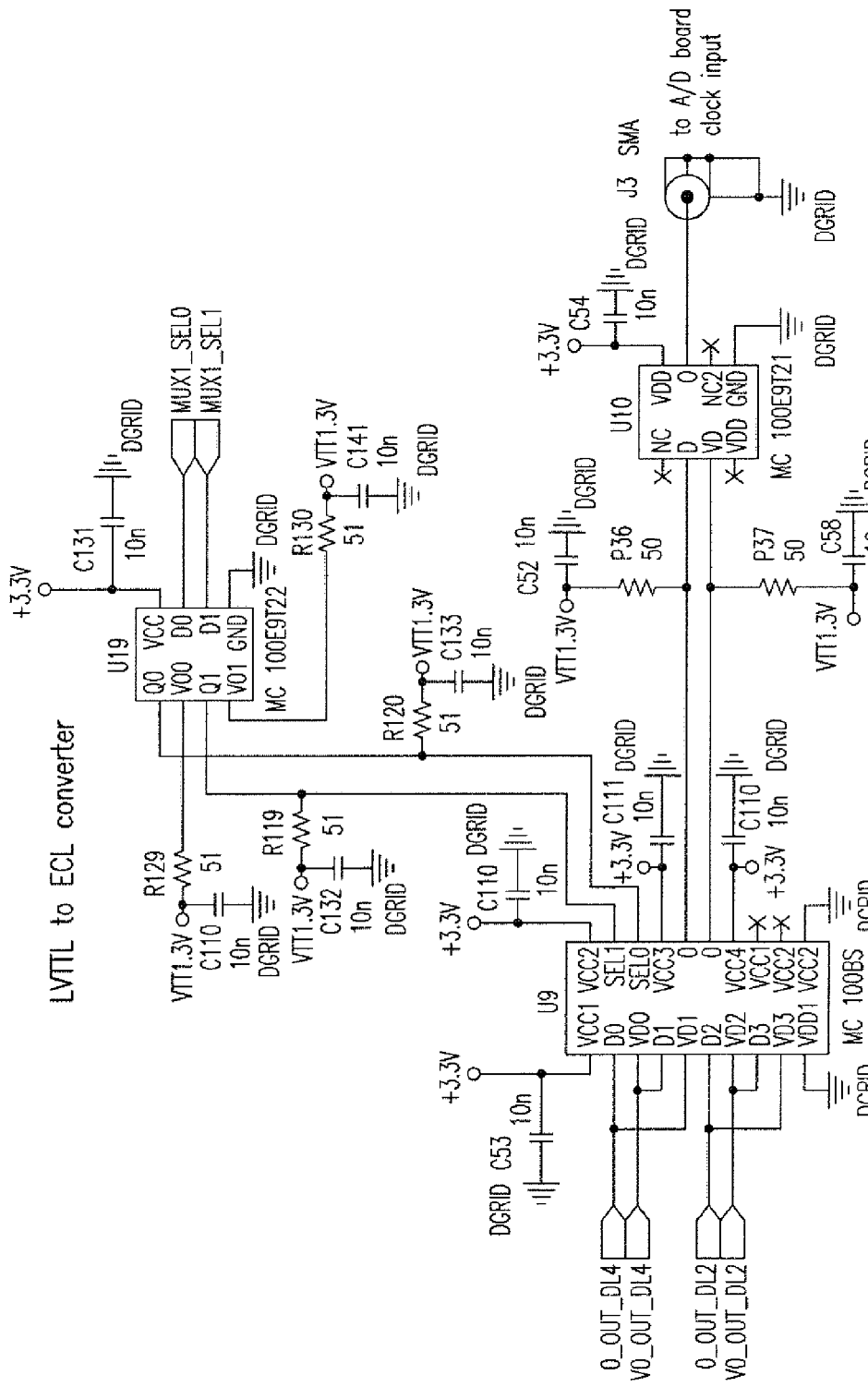
FIG. 11 is a circuit diagram of a multiplexer 1 and a level converter, in accordance with the principles of the present invention.

FIG. 11 shows an exemplary multiplexer and an exemplary level converter circuit diagram which can be used as an integral part of an exemplary CMR circuit 610 (See FIG. 6). A multiplexer and a level converter allow one of the four available clock signals (the output from DL1+DL2, the inverted output from DL1+DL2, the output from DL3+DL4, or the inverted output from DL3+DL4) to be selected and converted from PECL to LVTTL voltage levels for output as a clock signal to the ADC card. A second multiplexer and level converter allow a second clock signal to be chosen from the four available clock signals (the output from DL1+DL2, the inverted output from DL1+DL2, the output from DL3+DL4, or the inverted output from DL3+DL4) and converted from PECL to ECL for input to the sample and hold amplifier. This second clock signal is also converted from PECL to LVTTL for output to an ADC card if required. The two multiplexers are controlled by the same two 16 bit I2C GPIO control chips that are used to program the delay lines as described below (See FIG. 14).

Figures 1, 12:
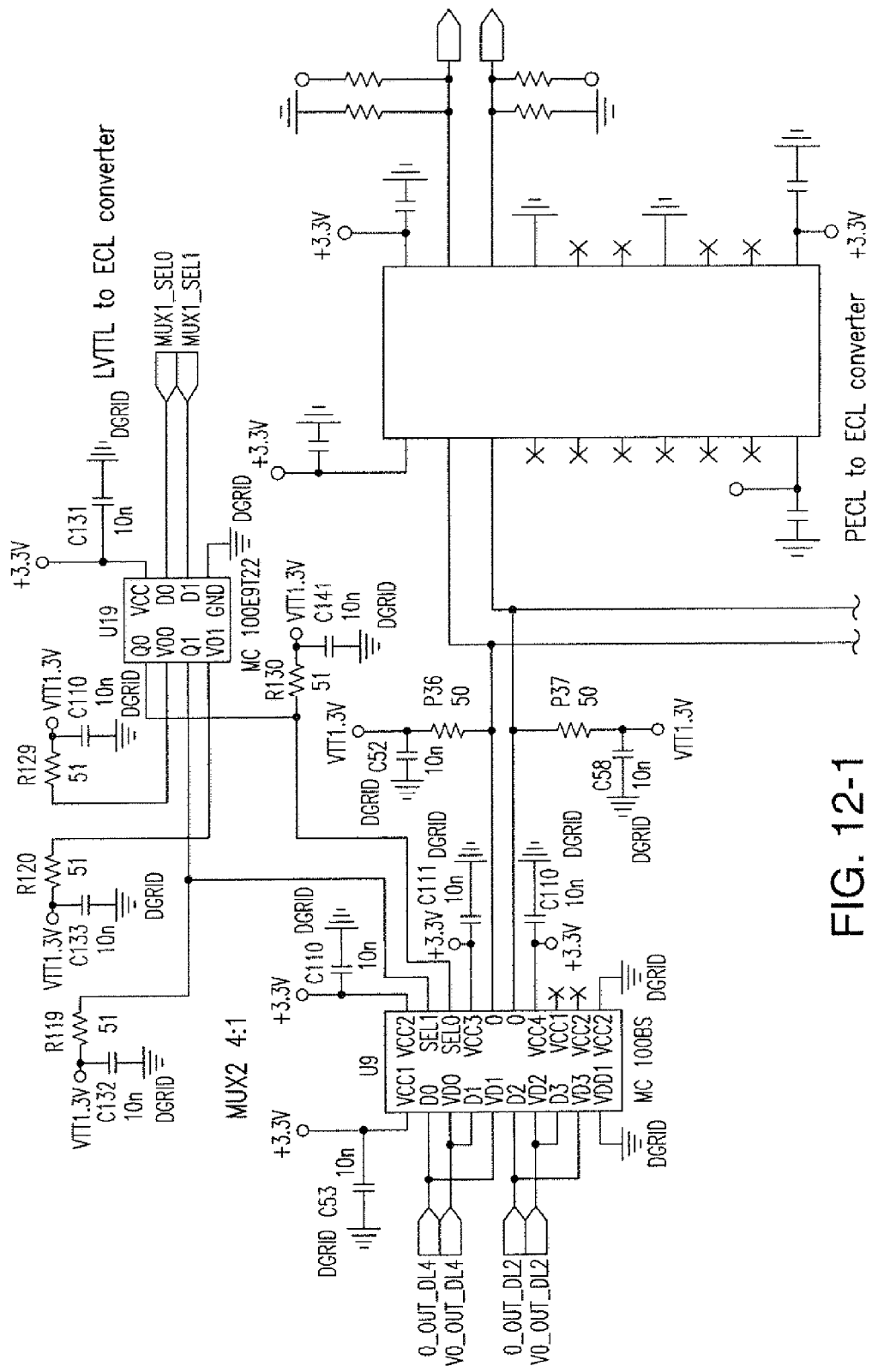
FIG. 12 is a circuit diagram of a multiplexer 2 and a level converter together with a sample and hold amplifier, in accordance with the principles of the present invention.
Figures 2, 12:
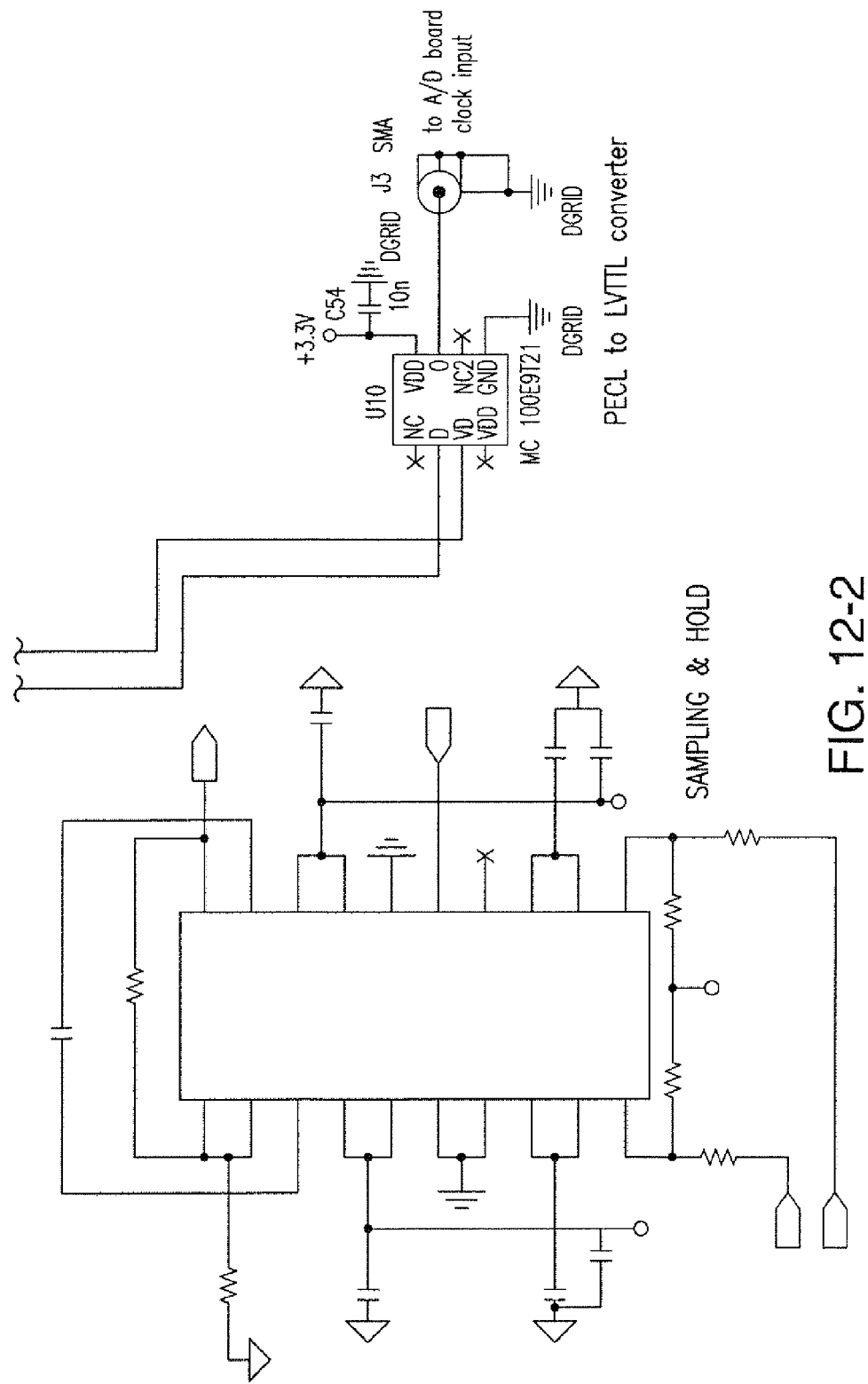

FIG. 12 shows an exemplary multiplexer and a level converter together with a sample and hold amplifier. The sample and hold amplifier which can be used as an integral part of an exemplary CMR circuit 610 (See FIG. 6), can be used to sample the chosen input signal (Reference PCD output or Reference PICC's Pickup coil output) using the clock selected via the multiplexer and level converter described above. For the first half of the clock cycle the output of the sample and hold amplifier tracks the input signal. When the clock signal transitions from low to high the input signal is sampled. The sampled signal is then held at the output of the sample and hold amplifier for the second half of the clock cycle. The sample and hold amplifier also amplifies the input signal (with approximately three times gain). By setting the clock signal used to sample the input signal to occur approximately 90° before the clock signal that is output to the ADC card it is possible to use the same two channel ADC card to acquire two signals 90° out of phase whilst being driven from a single clock.

Figure 13:
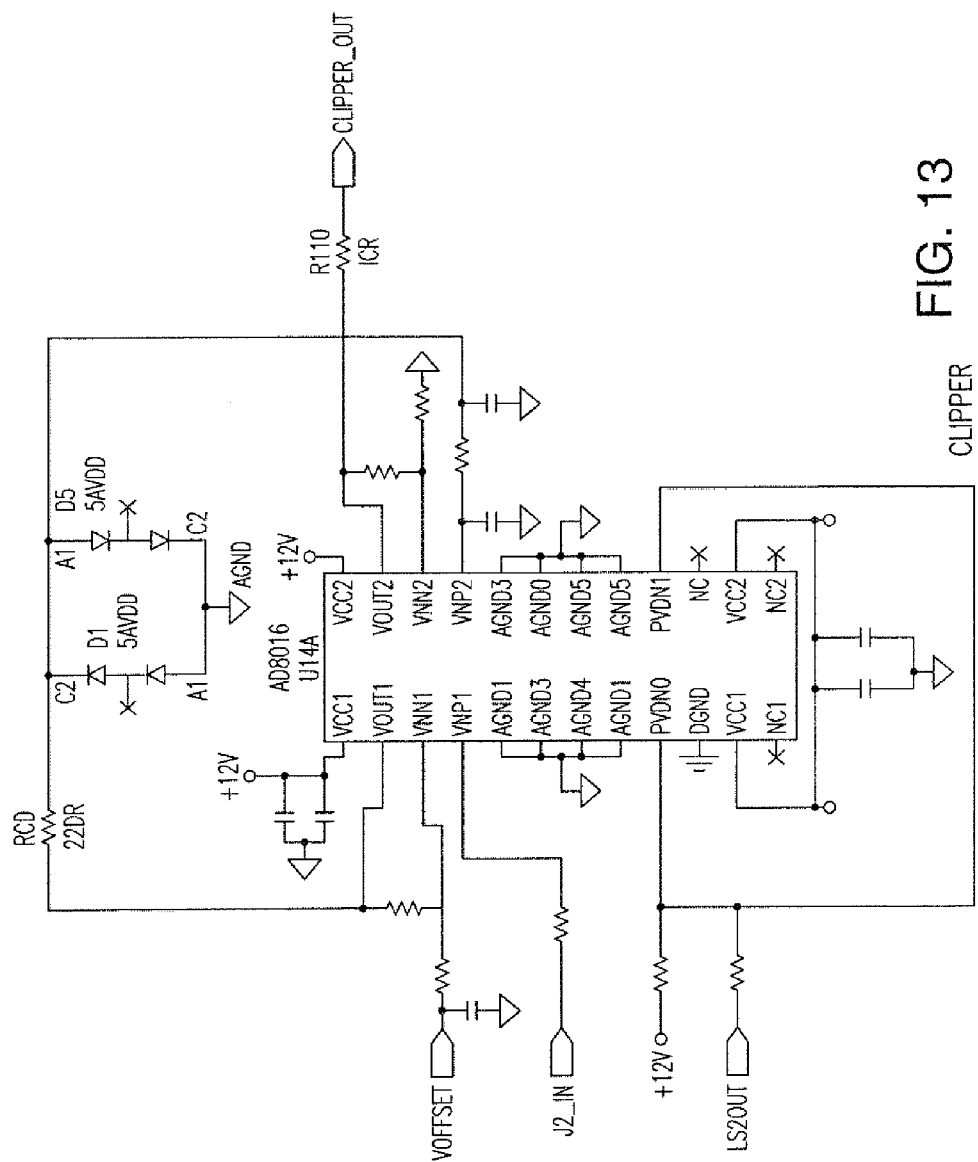
FIG. 13 is a circuit diagram of a clipper amplifier including a dual amplifier combined with a signal clipper formed from two pairs of diodes, in accordance with the principles of the present invention.

FIG. 13 shows an exemplary clipper amplifier which can be used as an integral part of an exemplary CMR circuit 610 (See FIG. 6). The clipper amplifier consists of a dual amplifier combined with a signal clipper formed from two pairs of diodes. The input signal (Reference PCD output or Reference PICC's Pickup coil output) can be applied to the first amplifier along with an adjustable voltage offset. The output signal of the first amplifier can be clipped using two pairs of diodes and then input to the second amplifier. The output of this second amplifier can then be selected (using the relay described above) to be the output of the exemplary Reference CMR circuit rather than the direct input signal. The purpose of the exemplary clipper amplifier is to amplify the peaks of the input signal to allow lower levels of load modulation to be measured using the ADC card and attain results better than those that can be achieved by using the ADC card to measure the input signal directly. The variable voltage offset is provided by an I2C DAC chip which can be used to centre the peaks of the output of the first amplifier around the 0V level so that once this signal has been clipped by the two diode pairs it can be further amplified by the second amplifier. If the signal from the clipper amplifier is not used (the output relay is used to select the direct output) the input signal is passed via a buffer amplifier so that it can drive a 50Ω load.

Figure 14:
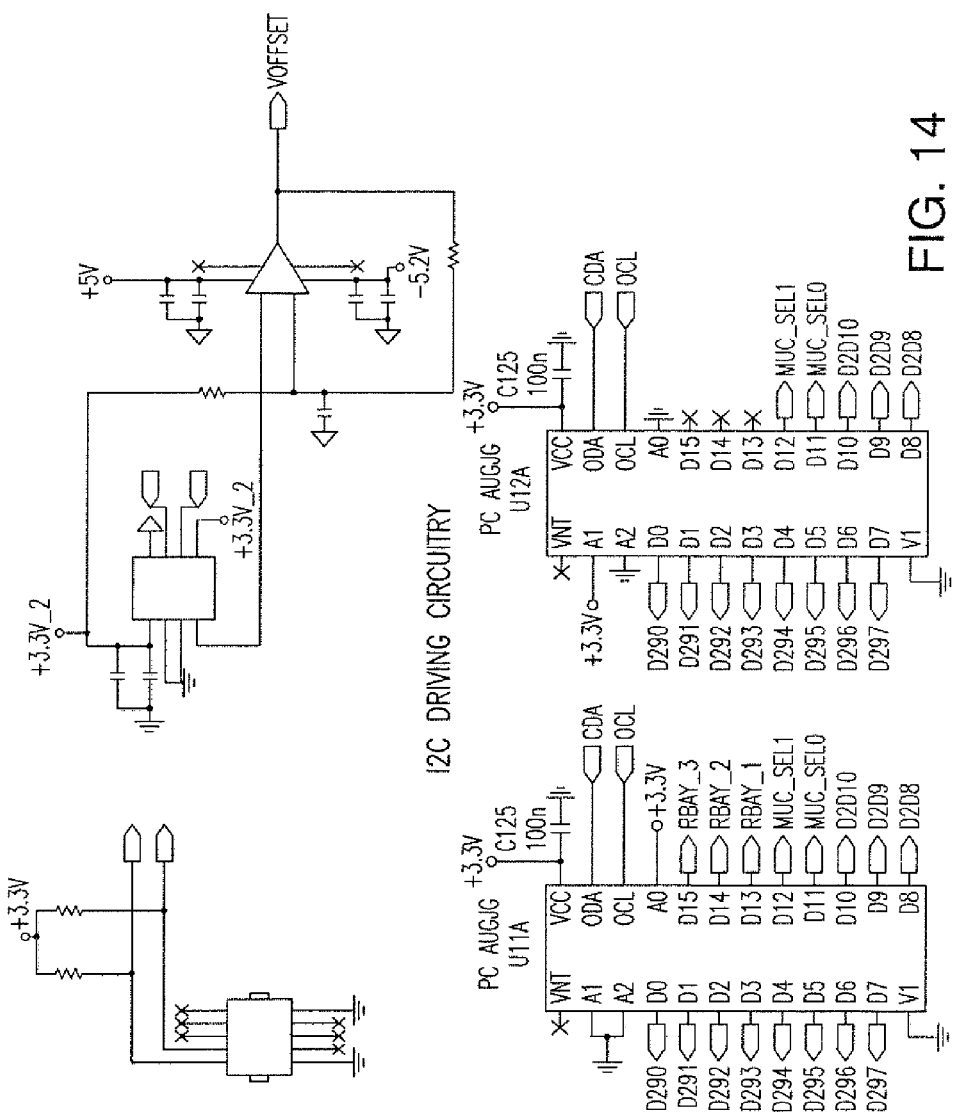
FIG. 14 is a circuit diagram of an I2C control circuitry, in accordance with the principles of the present invention.

FIG. 14 shows an exemplary I2C control circuitry which can be used as an integral part of an exemplary CMR circuit 610 (See FIG. 6). The I2C control circuitry consists of two 16 bit I2C GPIO chips and an I2C DAC can be used to produce the variable voltage offset for the clipper amplifier described above. The first of the two 16 bit I2C GPIO chips can be used to provide the delay setting for the pair of delay lines DL1+DL2, provide the control signals for the input and output relays, and select via a multiplexer which of the four available clock signals (the output from DL1+DL2, the inverted output from DL1+DL2, the output from DL3+DL4, or the inverted output from DL3+DL4) is output as the clock to the ADC card. The second of the two 16 bit I2C GPIO chips can be used to provide the delay setting for the pair of delay lines DL3+DL4 and select via a multiplexer which of the four available clock signals (the output from DL1+DL2, the inverted output from DL1+DL2, the output from DL3+DL4, or the inverted output from DL3+DL4) can be used by the sample and hold amplifier to sample the input signal. The output from the I2C DAC can be fed via an output amplifier to produce a ±3.3V bipolar variable voltage output that can be fed into the clipper amplifier to allow either the positive or the negative peaks to be analyzed.

The exemplary host controller can send commands to the GPIO interface chips in order to select the input and output signals to present at the hardware connectors, and adjusts the delay applied to the synchronous clock output. As will be further explained hereinafter, the controller can adjust the delay in order to achieve the maximum output of the sampled signal. (See Vpp in Amplitude Modulation on FIG. 3).

Figure 15:
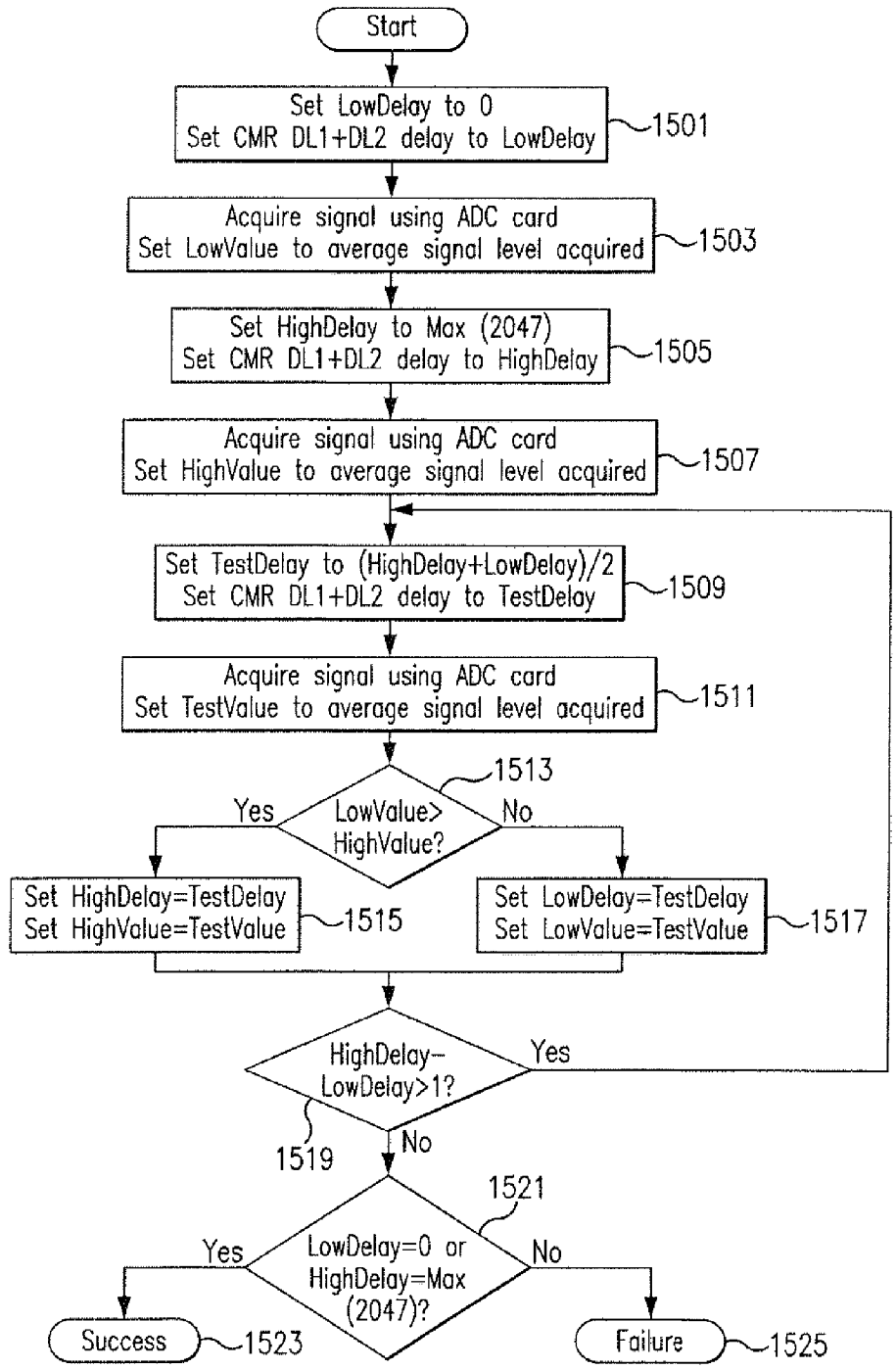
FIG. 15 is flowchart illustrating a DL1/DL2 delay setting process, in accordance with the principles of the present invention.

The process could be visualized by a flowchart shown in FIG. 15. In step 1501, while no modulation of the carrier is being performed the exemplary controller can set the delay lines so that the sampling clock is derived at a 0 delay from delay lines 1&2 (DL1+DL2) and stores that value (i.e. "0") in a LowDelay storage area. In step 1503, the ADC card captures the signal and retains information about the average voltage level in a LowValue storage of CPU. In step 1505, the exemplary controller sets the delay of delay lines 1&2 to its maximum value and stores that value (i.e. 2047 in one embodiment) in a HighDelay storage area. In step 1507, the signal is captured again and information about the average level is stored in a HighValue storage area. In steps 1509 and 1511, the exemplary controller sets the delay to be half way between 0 and its maximum value, stores that delay setting in a TestDelay storage area, and captures and stores the voltage level again in a TestValue storage area. In step 1513, the LowValue and HighValue signal levels are compared. If the LowValue is greater than the HighValue, the process proceeds to step 1515. Otherwise, the process goes to step 1517. In step 1515, the HighDelay storage area is set to the TestDelay value, and the HighValue storage area is set to the TestValue value. In step 1517, if the LowValue was not greater than the HighValue, the LowDelay storage area is set to TestDelay value, and the LowValue storage area is set to the TestValue. The process proceeds to step 1519, where a check is made as to whether HighDelay-LowDelay is greater than 1. If so, the process returns to step 1509, and continues to repeat until the difference between the HighDelay and LowDelay values is not greater than 1. The process then proceeds to step 1521 where a check is made as to whether the LowDelay value is 0 or the HighDelay value is still maximum (i.e. the initial settings). If either condition is true, the process has failed to optimize. If both conditions are false, the process successfully completed, and the HighDelay and/or LowDelay value will be used as the delay setting for DL1+DL2. If the process fails to optimize and reaches step 1525, it can be repeated by adjusting the DL3+DL4 delay lines using the process shown, beginning at step 1501, setting the output to be from DL3+DL4 rather than DL1+DL2. If that still fails, the output could be set to DL1+DL2, inverted, and the process repeated. This process should produce an optimum delay line setting which corresponds to sampling on the peaks of the input waveform. Finally, the output could be set to DL3+DL4 inverted, and the optimization process repeated.

While the present invention has been particularly described with reference to exemplary embodiments thereof, it will be understood by those skilled in the art that various modifications and alterations can be made without departing from the spirit and scope of the invention. Accordingly, the disclosed embodiments of the invention are considered merely illustrative, and the invention is limited in scope only as specified in the appended claims.

We claim:

1. A method for testing a reference contactless IC card (PICC), a reference proximity coupling device (PCD) or a waveform generator, wherein the PICC, the PCD or the waveform generator generates a modulated data signal by modulating a subcarrier of an RF carrier signal, the method comprising steps of:
    (a) receiving a modulated data signal;
    (b) detecting when the modulated data signal goes from positive to negative level or from negative to positive level;
    (c) producing a first output clock signal corresponding to the points when the modulated data signal crosses 0V;
    (d) delaying said first output clock signal using a series of delay lines to generate a second output clock signal that transitions substantially at the peak of the modulated data signal; and
    (e) sampling the modulated data signal using the second output clock signal to extract a load signal.

2. The method of claim 1 wherein the reference PICC communicates with the referenced PCD reader by load modulation using on-off keying or binary phase shift keying (BPSK) modulation.

3. The method of claim 1 wherein said series of delay lines are programmed by a host controller via an Inter IC bus interface.

4. The method of claim 3 using said host controller to send commands to General Purpose Input/Output (GPIO) interface chips that are used to select via one or more multiplexer the second output clock signal.

5. The method of claim 3 wherein said host controller sends commands to General Purpose Input/Output (GPIO) interface chips that are used to program said delay lines in order to achieve maximum amplitude of the extracted load signal.

6. The method of claim 1 further comprising generating a sample and hold signal and sample and hold clock by shifting said second output clock by 90°, and wherein the modulated data signal is then sampled using this sample and hold clock, and the sampled data is held in the sample and hold output for the second half of the clock cycle, whereby a single Analog-to-Digital circuit acquires two signals that are 90° out of phase whilst being driven from a single clock.

7. A system for testing a reference contactless IC card (PICC), a reference proximity coupling device (PCD) or a waveform generator, wherein the PICC, the PCD or the waveform generator generates a modulated data signal by modulating a subcarrier of an RF carrier signal, the system comprising:
    (a) a receiver for receiving said modulated data signal;
    (b) a zero-crossing detector for detecting when the modulated data signal goes from positive to negative level or from negative to positive level, and for producing a first output clock signal corresponding to the points when the modulated data signal crosses 0V;
    (c) at least two delay lines for generating a second output clock signal based on said first output clock signal that transitions substantially at the peak of the modulated data signal; and
    (d) a sampling circuit coupled to said second output clock signal for sampling said modulated data signal using said second output clock signal, whereby the sampled signal approximates said original data.

8. The system of claim 7 wherein the reference PICC communicates with the referenced PCD reader by load modulation using on-off keying or binary phase shift keying (BPSK) modulation.

9. The system of claim 7 further including a host controller, wherein said series of delay lines are programmed by the host controller via an interface.

10. The system of claim 9 further including one or more multiplexer coupled to said series of delay lines and at least two inputs and one or more Input/Output interface chip, wherein said host controller sends commands to said one or more interface chip to select via said one or more multiplexer at least one input signal.

11. The system of claim 9 further including at least one Input/Output interface chip wherein said host controller sends commands to said interface chip to program said delay lines in order to achieve maximum amplitude of the sampled signal.

12. The system of claim 7 further including a sample and hold signal generator to generate a sample and hold clock by shifting the second output clock by 90°, and wherein the modulated data signal is then sampled using said sample and hold clock, and said sampled data is held in the sample and hold output for the second half of the clock cycle, which permits the system to generate a second signal that is 90° out of phase with the modulated data signal, which in turn enables said sampling circuit to acquire two signals that are 90° out of phase whilst being driven from a single clock.

* * * * *